United States Patent
Schramm et al.

(10) Patent No.: US 9,963,241 B2
(45) Date of Patent: May 8, 2018

(54) AIRPLANE WITH A FUEL CELL DEVICE

(71) Applicant: Airbus Defence and Space GmbH, Ottobrunn (DE)

(72) Inventors: Gerrit Schramm, Uetersen (DE); Renè Langermann, Winsen (DE); Richard Trott, Hallbergmoos (DE); Arnd Schirrmann, Hamburg (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 61 days.

(21) Appl. No.: 15/034,708

(22) PCT Filed: Oct. 29, 2014

(86) PCT No.: PCT/DE2014/100385
§ 371 (c)(1),
(2) Date: May 5, 2016

(87) PCT Pub. No.: WO2015/067239
PCT Pub. Date: May 14, 2015

(65) Prior Publication Data
US 2016/0264253 A1   Sep. 15, 2016

(30) Foreign Application Priority Data
Nov. 7, 2013   (DE) .......................... 10 2013 112 248

(51) Int. Cl.
*B64D 41/00* (2006.01)
*F17C 9/04* (2006.01)
(Continued)

(52) U.S. Cl.
CPC .............. *B64D 41/00* (2013.01); *F02C 1/002* (2013.01); *F17C 9/04* (2013.01);
(Continued)

(58) Field of Classification Search
CPC ......... H01M 8/04007; H01M 8/04208; H01M 16/003; H01M 2250/20; H01M 2250/402;
(Continued)

(56) References Cited

U.S. PATENT DOCUMENTS 5,611,340 A * 3/1997 Souza .................... A61B 5/055
324/309
7,305,836 B2 * 12/2007 Egan ........................ F17C 3/04
220/560.03
(Continued)

FOREIGN PATENT DOCUMENTS

DE        19600936 A1      8/1996
DE     102007042711 B4     3/2009
(Continued)

OTHER PUBLICATIONS

Masson, P J, et al., "HTS machines as enabling technology for all-electric airborne vehicles", Superconductor Science and Technology, IOP Publishing, Techno House, Bristol, GB, vol. 20, No. 8, pp. 748-756, Aug. 1, 2007.

*Primary Examiner* — Dinh T Le
(74) *Attorney, Agent, or Firm* — Hoffmann & Baron, LLP

(57) ABSTRACT

An aircraft includes a fuel cell device which can be operated with hydrogen from a hydrogen tank and with oxygen drawn from the surrounding air, and further includes a superconducting magnetic energy storage unit (SMES unit) which is disposed, together with the hydrogen tank, in a cryogenic container, wherein the cryogenic container does not have an active cooling system or a liquid hydrogen generating device, and has a volume for holding a maximum of 40 kg liquid hydrogen.

16 Claims, 1 Drawing Sheet

(51) Int. Cl.
*F02C 1/00* (2006.01)
*H01M 16/00* (2006.01)
*H01M 8/04007* (2016.01)
*H01M 8/04082* (2016.01)

(52) U.S. Cl.
CPC ... *H01M 8/04007* (2013.01); *H01M 8/04208* (2013.01); *H01M 16/003* (2013.01); *B64D 2041/005* (2013.01); *H01M 2250/20* (2013.01); *H01M 2250/402* (2013.01); *Y02B 90/12* (2013.01); *Y02T 90/32* (2013.01); *Y02T 90/36* (2013.01)

(58) Field of Classification Search
CPC ......... B64D 41/00; Y02B 90/12; Y02T 90/32; Y02T 90/36
USPC .............. 307/9; 335/215, 216; 505/213, 700
See application file for complete search history.

(56) References Cited

U.S. PATENT DOCUMENTS

| | | |
|---|---|---|
| 2012/0240599 A1 | 9/2012 | Stolte |
| 2014/0000288 A1* | 1/2014 | Neumann ................. H01F 6/00 62/3.1 |

FOREIGN PATENT DOCUMENTS

| | | |
|---|---|---|
| DE | 102011013577 A1 | 9/2012 |
| DE | 102011014565 A1 | 9/2012 |

\* cited by examiner

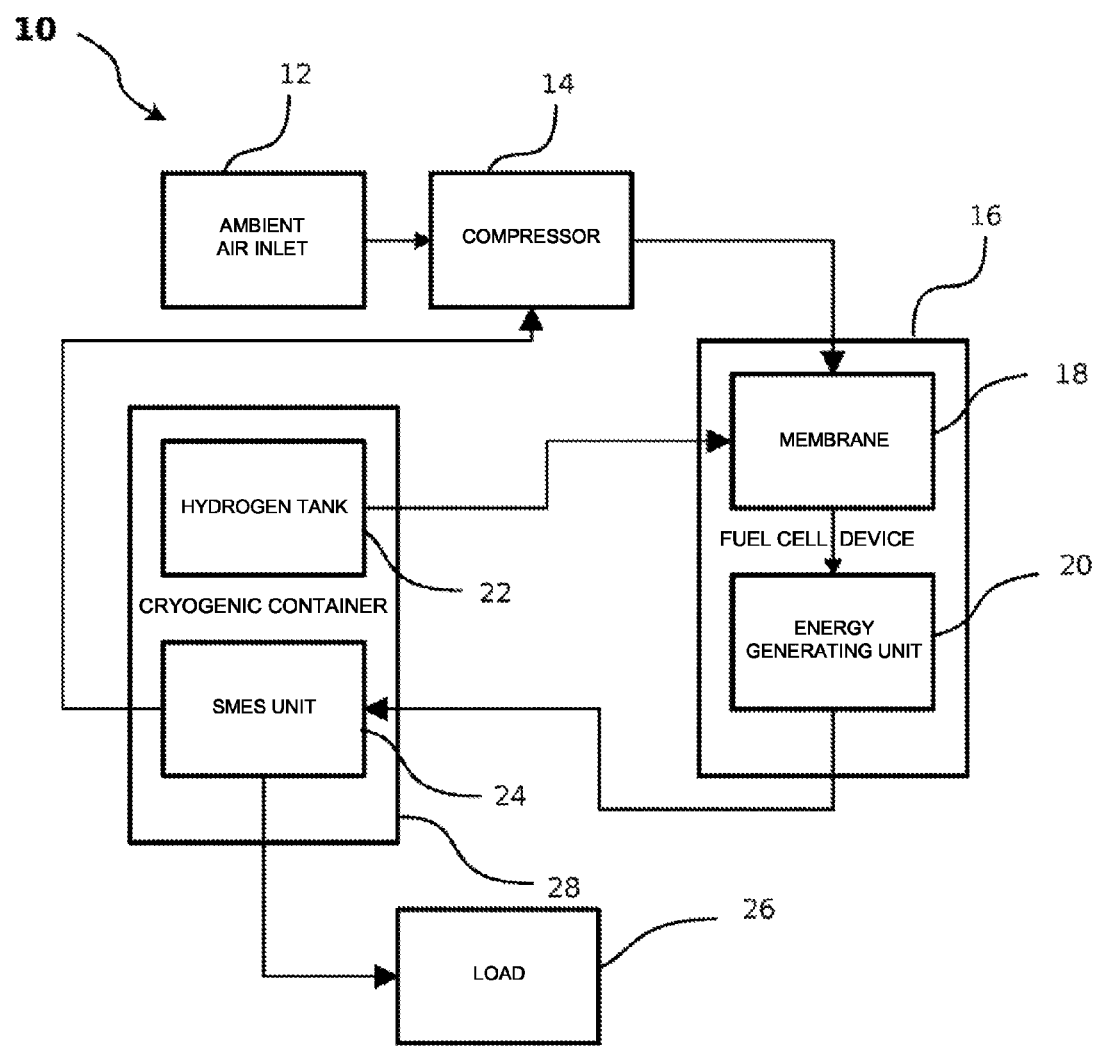

AIRPLANE WITH A FUEL CELL DEVICE

CROSS-REFERENCE TO RELATED APPLICATIONS

This application is the U.S. National Phase of, and Applicant claims priority from, International Application No. PCT/DE2014/100385, filed 29 Oct. 2014, and German Patent Application No. DE 10 2013 112 248.5, filed 7 Nov. 2013, both of which are incorporated herein by reference in their entirety.

BACKGROUND

Technical Field

The invention relates to an aircraft including a fuel cell device which can be operated with hydrogen from a hydrogen tank and with oxygen drawn from the surrounding air, and further including a superconducting magnetic energy storage unit (SMES unit) which is disposed, together with the hydrogen tank, in a cryogenic container.

Related Art

An energy generating device including a fuel cell device which can be operated with hydrogen from a hydrogen tank and with oxygen drawn from the surrounding air, and further including a superconducting magnetic energy storage unit (SMES unit) which is disposed, together with the hydrogen tank, in a cryogenic container is known from DE 10 2007 042 711 B4. In this case, synergistic effects are achieved by storing the liquid hydrogen required for operating the fuel cell device in the same tank as the SMES unit, since only one cooling unit is required. This energy generating device includes a hydrogen condenser, which is housed in the tank and which produces the liquid hydrogen while at the same time cooling the SMES unit. Thus, in order to produce the liquid hydrogen, energy is spent or is diverted from the energy that is generated. This assembly can therefore be used only for stationary plant operation.

DE 196 00 936 discloses an energy generating device for a seaplane, which uses liquid hydrogen and superconductors and which includes a liquid hydrogen tank and a separate SMES unit, with the SMES unit being cooled by the liquid hydrogen from the liquid hydrogen tank. The hydrogen that is evaporated by an inflow of heat is reliquefied by means of a heat exchanger.

DE 10 2011 014 565 A1 discloses an aircraft including a fuel cell device, which can be operated with hydrogen from a hydrogen tank that is disposed in a cryogenic container. The oxygen is drawn from the surrounding air. The fuel cell device is used to supply the aircraft with electric power for a limited amount of time. In this case, the tank is designed to hold 50 kg to 60 kg of hydrogen.

DE 10 2011 013 577 A1 discloses a system for storing hydrogen and electric energy.

SUMMARY

Proceeding from the above, it is the object of the invention to provide an energy generating device that is structurally simple and compact, but which will meet the necessary safety requirements, and which can supply electric energy in an aircraft in cases of transitional load, especially during on-ground stops.

This object is attained according to the invention by the features specified in claim 1. Advantageous embodiments are specified in the dependent claims.

The electric energy required to supply the output power for a transition load of a dynamic fuel cell system without interruption is stored in the SMES unit, which is cooled in the cryogenic environment of the hydrogen store of the fuel cell system. The particularly high energy density of an SMES unit and the dual use of the cryogenic environment decrease the weight of the system as a whole. Since the special constraints of air travel necessitate the lowest possible weight, the hydrogen tank is refilled after every flight. The tank is therefore configured as relatively small, with dimensions up to a maximum of 40 kg hydrogen. Refilling the tank before every flight allows dispensing with an active cooling system, thereby decreasing the overall structural expenditure and weight. It is further ensured that, in the event of a leak or a consumption of the entire hydrogen supply, the superconductor and the aircraft as a whole will not be damaged. The aircraft remains maintenance-free even with an uncooled superconductor.

In the following, the invention will be specified in greater detail in reference to the attached drawing.

BRIEF DESCRIPTION OF THE DRAWINGS

FIG. 1 shows a schematic representation of an energy generating device for an aircraft.

DETAILED DESCRIPTION

FIG. 1 shows a schematic representation of an energy generating device 10 for an aircraft, which is not shown. The energy generating device 10 includes an ambient air inlet 12, an electromechanical compressor 14, a fuel cell device 16, and a cryogenic container 28.

The ambient air inlet 12 is for the intake and purification of ambient air (for example, removing sand, etc.) and supplies the air to the electromechanical compressor 14, which feeds compressed air to the fuel cell device 16.

The fuel cell device 16 includes a membrane unit 18 and an energy generating unit 20. Moreover, the cryogenic container 28 includes a hydrogen tank 22 and an SMES unit 24.

Hydrogen tank 22 is for holding liquid hydrogen and supplies the hydrogen to membrane unit 18, where the hydrogen reacts with oxygen of the air supplied by compressor 14, resulting in the generation of electric energy in energy generating unit 20, with formation of water.

The electric energy generated in energy generating unit 20 is supplied to the SMES unit 24, which uses part of the energy to power compressor 14, while the majority of the generated energy remains available for powering one or more electric loads 26. Electric loads 26 are any electric devices in the aircraft, in particular a computer system, a lighting system, and an air-conditioning system.

Hydrogen tank 22 and SMES unit 24 are housed together in the cryogenic container 28, which is common to both hydrogen tank 22 and SMES 24, so that the coil (not shown) of SMES unit 24 is cooled by the cryogenic hydrogen. Cryogenic container 28 has only passive heat insulation, and no active cooling devices. Also, there are provided no devices for liquefying hydrogen, which would increase energy consumption.

Thus, although the duration of use or of energy supply of the device according to the invention is limited, the dimensions of the hydrogen supply can be configured for routine flight times and on-ground times during intermediate stops. As a result, preferably only a portion of the hydrogen is consumed during normal operation, while another portion, more particularly about 50%, remains available for cooling purposes.

LIST OF REFERENCE SIGNS 10 energy generating device
12 ambient air inlet
14 compressor
16 fuel cell device
18 membrane
20 energy generating unit
22 hydrogen tank
24 SMES unit
26 load
28 cryogenic container

The invention claimed is:

1. An aircraft comprising:
an ambient air inlet to intake and purify ambient air;
a cryogenic container comprising a hydrogen tank and a superconducting magnetic energy storage unit (SMES unit), the hydrogen tank to store liquid hydrogen, the SMES unit to store electrical energy; and
a fuel cell device connected to the ambient air inlet by an air supply line and to the hydrogen tank of the cryogenic container by a hydrogen supply line, the fuel cell device to supply the electrical energy from a reaction of the liquid hydrogen and oxygen of the ambient air to the SMES unit of the cryogenic container, wherein the cryogenic container does not have an additional cooling system or an additional liquid hydrogen generating device, and wherein the cryogenic container is dimensioned so that the hydrogen tank stores a maximum of 40 kg liquid hydrogen.

2. The aircraft according to claim 1, wherein the cryogenic container is dimensioned so that the hydrogen tank stores a maximum of 30 kg liquid hydrogen.

3. The aircraft according to claim 1, wherein the aircraft comprises an electromechanical compressor unit arranged in the air supply line to compress the ambient air supplied to the fuel cell device.

4. The aircraft according to claim 1, wherein the electrical energy from the fuel cell device is supplied to the SMES unit by an electrical supply line.

5. The aircraft according to claim 3, wherein the SMES unit is electrically connected to the compressor unit by electrical output line to supply a part of the electrical energy to the compressor unit.

6. The aircraft according to claim 1, wherein the SMES unit is electrically connected to a load of the aircraft by an electrical output line to supply a part of the electrical energy to the load.

7. The aircraft according to claim 6, wherein the load of the aircraft is at least one system of a group comprising: a computer system; a lighting system; and an air-conditioning system.

8. The aircraft according to claim 1, wherein the fuel cell device comprises a membrane unit and an energy generating unit.

9. The aircraft according to claim 1, wherein the cryogenic container comprises a heat insulator.

10. An aircraft comprising:
a cryogenic container comprising only a hydrogen tank and a superconducting magnetic energy storage unit (SMES unit), the hydrogen tank to store liquid hydrogen, the SMES unit to store electrical energy and to be cooled by the liquid hydrogen stored in the hydrogen tank, the cryogenic container being dimensioned so that the hydrogen tank stores a maximum of 40 kg liquid hydrogen; and
a fuel cell device connected to an ambient air inlet by an air supply line and to the hydrogen tank of the cryogenic container by a hydrogen supply line, the fuel cell device to supply the electrical energy from a reaction of the liquid hydrogen and oxygen of ambient air to the SMES unit of the cryogenic container.

11. A method of generating electrical energy in an aircraft, the method comprising:
providing in the aircraft a cryogenic container that comprises only a hydrogen tank and a superconducting magnetic energy storage unit (SMES unit);
filling liquid hydrogen into the hydrogen tank to store a maximum of 40 kg of liquid hydrogen before starting a mission associated with the aircraft;
supplying the liquid hydrogen from the hydrogen tank and ambient air to a fuel cell device so as to generate electrical energy during the mission associated with the aircraft; and
cooling the SMES unit with the liquid hydrogen stored in the hydrogen tank of the cryogenic container.

12. The method according to claim 11, wherein the method comprises re-filling the hydrogen tank with liquid hydrogen to store the maximum of 40 kg of liquid hydrogen after finishing the mission associated with the aircraft.

13. The method according to claim 11, wherein the method comprises compressing the ambient air supplied to the fuel cell device.

14. The method according to claim 11, wherein the method comprises supplying to the fuel cell device only a portion of the liquid hydrogen stored in the hydrogen tank during the mission associated with the aircraft.

15. The method according to claim 14, wherein the portion supplied to the fuel cell device during the mission is up to 50 percent of the liquid hydrogen stored in the hydrogen tank.

16. The method according to claim 11, wherein the method comprises storing the electrical energy generated by the fuel cell device in the SMES unit.

* * * * *